US 8,489,618 B2

(12) United States Patent
L'Heureux et al.

(10) Patent No.: US 8,489,618 B2
(45) Date of Patent: Jul. 16, 2013

(54) STATISTICAL RECORD LINKAGE CALIBRATION FOR GEOGRAPHIC PROXIMITY MATCHING

(75) Inventors: George Conrad L'Heureux, Dayton, OH (US); David Alan Bayliss, Delray Beach, FL (US)

(73) Assignee: LexisNexis Risk Data Management Inc., Boca Raton, FL (US)

( * ) Notice: Subject to any disclaimer, the term of this patent is extended or adjusted under 35 U.S.C. 154(b) by 207 days.

(21) Appl. No.: 13/017,503

(22) Filed: Jan. 31, 2011

(65) Prior Publication Data

US 2011/0191353 A1   Aug. 4, 2011

Related U.S. Application Data

(60) Provisional application No. 61/299,398, filed on Jan. 29, 2010.

(51) Int. Cl.
*G06F 17/30* (2006.01)
(52) U.S. Cl.
USPC ............................................ 707/749; 706/45
(58) Field of Classification Search
USPC ........................................... 706/58; 707/749
See application file for complete search history.

(56) References Cited

U.S. PATENT DOCUMENTS

| 2003/0074471 A1 | 4/2003 | Anderson et al. |
| 2006/0058958 A1 | 3/2006 | Galbreath et al. |
| 2008/0104005 A1 | 5/2008 | Dalton |
| 2009/0271397 A1 | 10/2009 | Bayliss |

OTHER PUBLICATIONS

International Search Report for International Application No. PCT/US11/023191, mailed Mar. 25, 2011.
Written Opinion for International Application No. PCT/US11/023191, mailed Mar. 25, 2011.

*Primary Examiner* — Huawen Peng
(74) *Attorney, Agent, or Firm* — Mark Lehi Jones; Ryan A. Schneider, Esq.; Troutman Sanders LLP

(57) ABSTRACT

Disclosed is a system for, and method of, calculating parameters used to determine whether records and entity representations should be linked. The system and method use a symmetric and reflexive function to allow for linking records and entity representations whose field values differ. The system and method apply iterative techniques such that parameters from each linking iteration are used in the next linking iteration. The system and method need no human interaction in order to calibrate and utilize record matching formulas used for the linking decisions. These techniques may be used for geographic location proximity matching.

16 Claims, 3 Drawing Sheets

STATISTICAL RECORD LINKAGE CALIBRATION FOR GEOGRAPHIC PROXIMITY MATCHING

CROSS-REFERENCE TO RELATED APPLICATIONS

This application claims the benefit of priority under 35 U.S.C. §119(e) of U.S. Provisional Application Ser. No. 61/299,398 filed on Jan. 29, 2010 the content of which is relied upon and incorporated herein by reference in its entirety.

Reference is made to the following patents and patent applications which are related to the present disclosure and are incorporated herein by reference as though fully set forth in their entireties:

U.S. Pat. No. 7,293,024 entitled "Method for sorting and distributing data among a plurality of nodes" to Bayliss et al.;

U.S. Pat. No. 7,240,059 entitled "System and method for configuring a parallel-processing database system" to Bayliss et al.;

U.S. Pat. No. 7,185,003 entitled "Query scheduling in a parallel-processing database system" to Bayliss et al.;

U.S. Pat. No. 6,968,335 entitled "Method and system for parallel processing of database queries" to Bayliss et al.;

U.S. patent application Ser. No. 10/357,447 entitled "Method and system for processing data records" to Bayliss et al.;

U.S. patent application Ser. No. 10/357,481 entitled "Method and system for linking and delinking data records" to Bayliss et al.;

U.S. patent application Ser. No. 10/293,482 entitled "Global-results processing matrix for processing queries" to Bayliss et al.;

U.S. patent application Ser. No. 10/293,475 entitled "Failure recovery in a parallel-processing database system" to Bayliss et al.;

U.S. patent application Ser. No. 10/357,418 entitled "Method and system for processing and linking data records" to Bayliss et al.;

U.S. patent application Ser. No. 10/357,405 entitled "Method and system for processing and linking data records" to Bayliss et al.;

U.S. patent application Ser. No. 10/357,489 entitled "Method and system for associating entities and data records" to Bayliss et al.;

U.S. patent application Ser. No. 10/357,484 entitled "Method and system for processing data records" to Bayliss et al.;

U.S. patent application Ser. No. 11/671,090 entitled "Query scheduling in a parallel-processing database system" to Bayliss et al.;

U.S. patent application Ser. No. 11/772,634 entitled "System and method for configuring a parallel-processing database system" to Bayliss et al.; and U.S. patent application Ser. No. 11/812,323 entitled "Multi-entity ontology weighting systems and methods" to Bayliss.

The above applications are referred to herein as the "First Generation Patents And Applications." This disclosure may refer to various particular features (e.g., figures, tables, terms, etc.) in the First Generation Patents And Applications. In the case of any ambiguity of what is being referred to, the features as described in U.S. patent application Ser. No. 11/772,634 entitled "System and method for configuring a parallel-processing database system" to Bayliss et al. shall govern.

Reference is also made to the following patent applications which are incorporated herein by reference as though fully set forth in their entireties:

U.S. patent application Ser. No. 12/188,742 entitled "Database systems and methods for linking records and entity representations with sufficiently high confidence" to Bayliss;

U.S. patent application Ser. No. 12/429,337 entitled "Statistical record linkage calibration for multi token fields without the need for human interaction" to Bayliss;

U.S. patent application Ser. No. 12/429,350 entitled "Automated selection of generic blocking criteria" to Bayliss;

U.S. patent application Ser. No. 12/429,361 entitled "Automated detection of null field values and effectively null field values" to Bayliss;

U.S. patent application Ser. No. 12/429,370 entitled "Statistical record linkage calibration for interdependent fields without the need for human interaction" to Bayliss;

U.S. patent application Ser. No. 12/429,377 entitled "Statistical record linkage calibration for reflexive, symmetric and transitive distance measures at the field and field value levels without the need for human interaction" to Bayliss;

U.S. patent application Ser. No. 12/429,382 entitled "Statistical record linkage calibration at the field and field value levels without the need for human interaction" to Bayliss;

U.S. patent application Ser. No. 12/429,394 entitled "Statistical record linkage calibration for reflexive and symmetric distance measures at the field and field value levels without the need for human interaction" to Bayliss;

U.S. patent application Ser. No. 12/429,403 entitled "Adaptive clustering of records and entity representations" to Bayliss;

U.S. patent application Ser. No. 12/429,408 entitled "Automated calibration of negative field weighting without the need for human interaction" to Bayliss;

U.S. patent application Ser. No. 12/496,861 entitled "Statistical measure and calibration of search criteria where one or both of the search criteria and database is incomplete" to Bayliss;

U.S. patent application Ser. No. 12/496,876 entitled "A system and method for identifying entity representations based on a search query using field match templates" to Bayliss;

U.S. patent application Ser. No. 12/496,888 entitled "Batch entity representation identification using field match templates" to Bayliss;

U.S. patent application Ser. No. 12/496,899 entitled "System for and method of partitioning match templates" to Bayliss;

U.S. patent application Ser. No. 12/496,915 entitled "Statistical measure and calibration of internally inconsistent search criteria where one or both of the search criteria and database is incomplete" to Bayliss;

U.S. patent application Ser. No. 12/496,929 entitled "Statistical measure and calibration of reflexive, symmetric and transitive fuzzy search criteria where one or both of the search criteria and database is incomplete" to Bayliss;

U.S. patent application Ser. No. 12/496,948 entitled "Entity representation identification using entity representation level information" to Bayliss; and U.S. patent application Ser. No. 12/496,965 entitled "Technique for recycling match weight calculations" to Bayliss.

These applications are referred to herein as the "Second Generation Patents And Applications."

Reference is also made to the following patent applications which are incorporated herein by reference as though fully set forth in their entireties: U.S. patent application Ser. No. 10/866,456 entitled "System and method for returning results of a query from one or more slave nodes to one or more master nodes of a database system" to Chapman et al., U.S. patent application Ser. No. 10/866,204 entitled "System and method for processing query requests in a database system" to Chapman et al., U.S. patent application Ser. No. 10/866,565 entitled "System and method for processing a request to perform an activity associated with a precompiled query" to Chapman et al., and U.S. patent application Ser. No. 10/866,394 entitled "System and method for managing throughput in the processing of query requests in a database system" to Chapman et al. These applications are referred to herein as the "'866 Applications." This disclosure may refer to various particular features (e.g., figures, tables, terms, etc.) in the '866 Applications. In the case of any ambiguity of what is being referred to, the features as described in U.S. patent application Ser. No. 10/866,204 entitled "System and method for processing query requests in a database system" to Chapman et al. shall govern.

FIELD OF THE INVENTION

Embodiments provided herein generally relate to database systems and methods, and particularly to a technique for linking records in a database. Certain embodiments allow for accurate linkage of records containing geographic location information using an iterative process without the need for human interaction.

BACKGROUND OF THE INVENTION

A link determination may be made on a pair of records using fuzzy matching techniques on the field values contained in one or more address fields. In such instances, the pair of records may be determined to match even though every field value in the one or more address fields may not exactly match. For example, a pair of records that contain field values that match in a street name field, a city name field, and a state name field may be considered a fuzzy match while a pair of records that contain field values that match in a street number field, a street name field, a city name field, and a state name field may be considered a stronger fuzzy match. Such naïve fuzzy matching techniques, however, may fail to consider the geographic location of an address. Accordingly, a record associated with an individual that indicates an address near, and on a one side of a state boundary, and a record associated with the same individual that indicates an address near, and on the other side of the state boundary, may not be considered a match using such fuzzy matching techniques, even though the actual physical locations might be very close together.

SUMMARY OF THE INVENTION

Certain embodiments are disclosed herein. In one embodiment, a method for generating entity representations in a computer implemented database using a record matching formula and for generating parameters for the record matching formula may include a database that includes a plurality of records, each record including a plurality of fields, each field capable of containing a field value, where at least a portion of parameters for the record matching formula are generated using a symmetric and reflexive function and configured for a particular field value appearing in a selected field of at least one record. The embodiment may provide for linking records or entity representations with non-identical field values. The embodiment may also include forming a notional grid over a geographic area of interest that contains a plurality of points, where the geographic area of interest includes a plurality of squares and where each of the plurality of points is associated with one of the plurality of records in the database that contains absolute geographic location information. The embodiment may also include calculating a plurality of match probabilities, where each match probability reflects a likelihood that an arbitrary point in the geographic area of interest lies within a distance of a square within which the arbitrary point lies as determined by the symmetric and reflexive function. The embodiment may further include calculating a plurality of match weights based on the plurality of match probabilities. The embodiment may further include linking at least two entity representations in the database based on one or more of the plurality of match weights using the record matching formula. The embodiment may further include retrieving information from at least one record in the database.

In another embodiment, a system for generating entity representations in a computer implemented database using a record matching formula and for generating parameters for the record matching formula may include a database that includes a plurality of records, each record including a plurality of fields, each field capable of containing a field value, where at least a portion of parameters for the record matching formula are generated using a symmetric and reflexive function and configured for a particular field value appearing in a selected field of at least one record. The system may provide for linking records or entity representations with non-identical field values. The embodiment may also include a processor programmed to form a notional grid over a geographic area of interest that contains a plurality of points, where the geographic area of interest includes a plurality of squares and where each of the plurality of points is associated with one of the plurality of records in the database that contains absolute geographic location information. The embodiment may also include a processor programmed to calculate a plurality of match probabilities, where each match probability reflects a likelihood that an arbitrary point in the geographic area of interest lies within a distance of a square within which the arbitrary point lies as determined by the symmetric and reflexive function. The embodiment may further include a processor programmed to calculate a plurality of match weights based on the plurality of match probabilities. The embodiment may further include a processor programmed to link at least two entity representations in the database based on one or more of the plurality of match weights using the record matching formula. The embodiment may further include a processor programmed to retrieve information from at least one record in the database.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims.

The invention, both as to its structure and operation together with the additional objects and advantages thereof are best understood through the following description of exemplary embodiments of the present invention when read in conjunction with the accompanying drawing, wherein like structure is indicated with like reference numerals and in which.

DETAILED DESCRIPTION

Certain terms used herein are discussed presently. The term "entity representation" encompasses at least one record, and, more typically, a collection of linked records that refer to the same individual. This term is meant to embrace the computer implemented entities of the First Generation Patents And Applications. The term "field" encompasses any portion of a record into which a field value may be entered. The term "field value" encompasses means and manners used to represent information, not limited to numerical values. A "field value" may include other types of data values comprising one or more character types or combination of character types. This term is meant to embrace the "data field values" of the First Generation Patents And Applications. The term "individual" encompasses a natural person, a company, a body of work, and any institution. The term "probability" encompasses any quantitative measure of likelihood or possibility, not limited to numerical quantities between zero and one. The term "record" encompasses any data structure having at least one field. This term is meant to embrace the "entity references" of the First Generation Patents And Applications. The discussion in this paragraph is meant to provide instances of what is embraced by certain terms by way of non-limiting example and should not be construed as restricting the meaning of such terms.

An exemplary embodiment of the present invention may utilize geographical coordinates (e.g., latitude coordinates, longitude coordinates) in a record in a database. The distance between two locations that are associated with two records in a database may be measured and used to determine whether a fuzzy match exists between the two records. In such embodiments, the distance metric may be associated with a symmetric, reflexive function that allows match weights to be calculated for a given distance from a particular point of interest.

Since such fuzzy matching in this manner would require computationally intense calculations (e.g., comparing billions of records to billions of records using floating point math) that would significantly increase processing time, the present invention provides a fuzzy matching scheme that significantly reduces the required computations.

Figure 1:
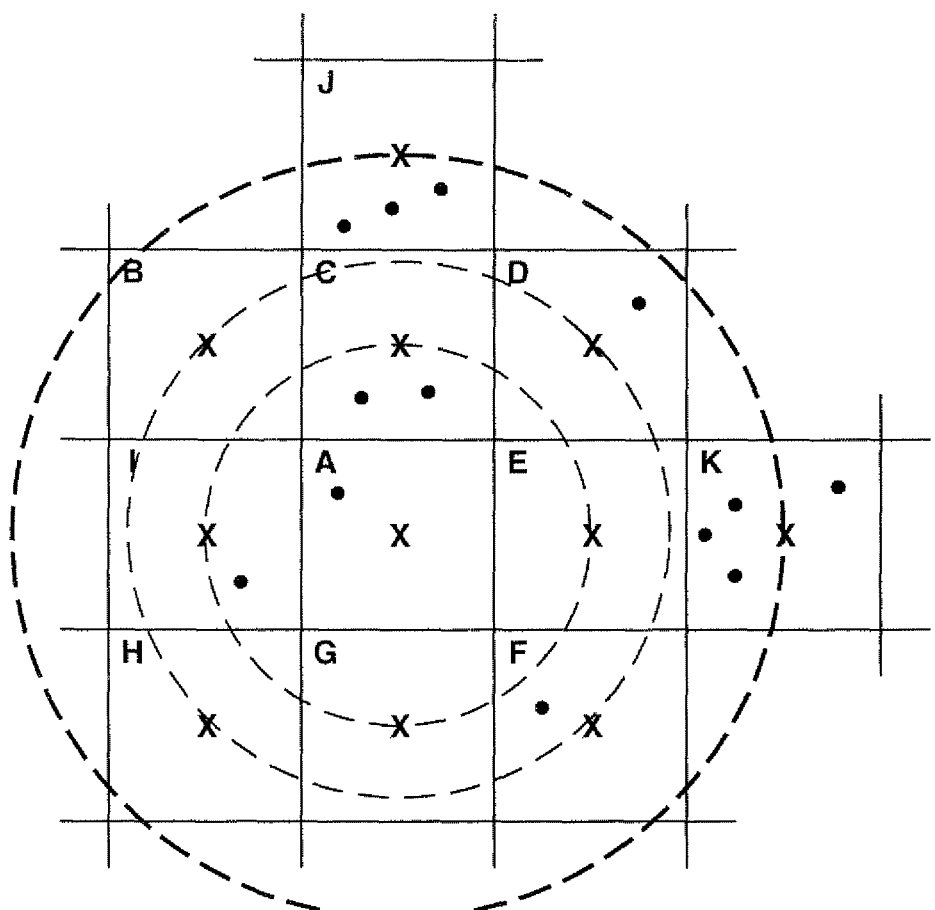
FIG. 1 depicts a portion of a geographic area of interest according to one or more embodiments shown and described herein.

FIG. 1 illustrates a portion of a geographic area of interest as considered by certain embodiments of the present invention. The area of interest may be, for example, the entire continental U.S., the entire U.S., all of North America, any continent, or the world. Each point on FIG. 1 represents geographic coordinates per a record or entity representation. That is, each point represents the location represented by geographic coordinates that appear in a record or entity representation. As used herein, the term "point" means record or entity representation containing absolute location information such as geographic coordinates (rather than solely political information such as state or street address). According to embodiments of the present invention, each point is electronically stored in a computer-implemented database. For purposes of illustration, thirteen points are depicted in FIG. 1.

Figure 2:
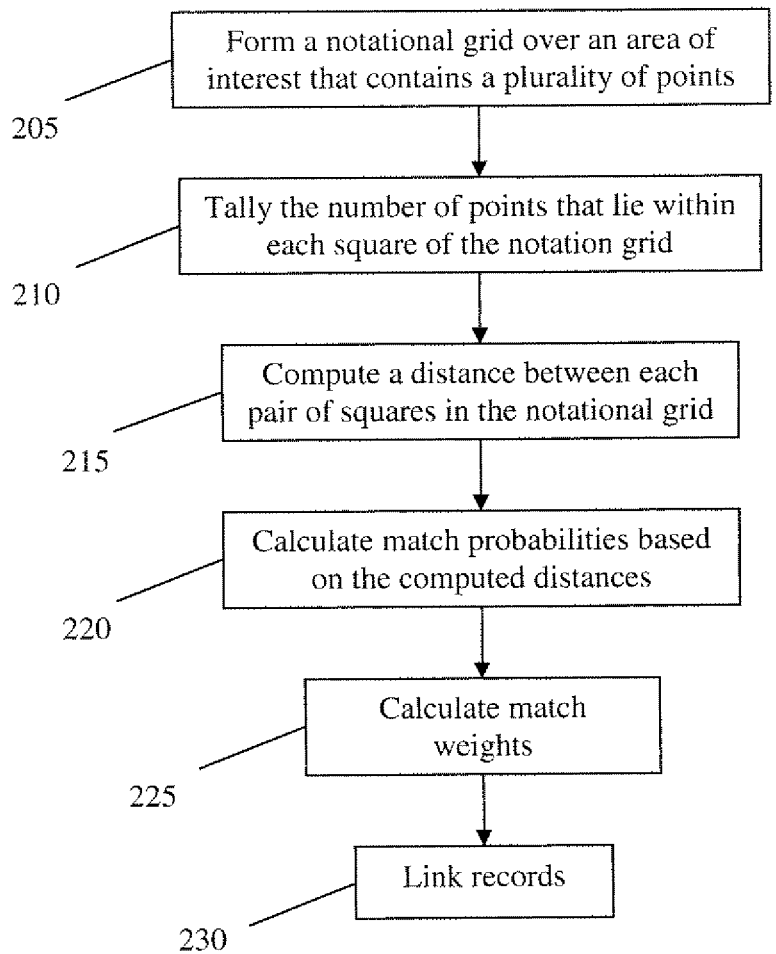
FIG. 2 depicts a flowchart depicting an exemplary embodiment according to one or more embodiments shown and described herein.

FIG. 2 is a flowchart depicting an exemplary embodiment of the present invention. At block 205, the process according to an exemplary embodiment proceeds to form a notional (i.e. virtual) grid over the area of interest. (This step, as well as the other process steps discussed herein are performed by a properly programmed computer.) FIG. 1 illustrates a portion of such a notional grid. The grid may be defined by some chosen fraction of latitude and longitude degrees. For example, each side of a square may represent 0.00001°. Other portion of degrees are also contemplated, but for the purposes of illustration, the present example discussed in relation to FIG. 1 will continue under the assumption that each square side represents 0.00001°.

Each square in the grid may be associated with a point at one of its corners. For example, each square may be associated with the point at the lower (southern) left (western) corner of the square. This association allows for an efficient determination of which square a given point lies within. For example, if a point is located at (35.29843890°, 85.98073903°), then the square that it lies within may be identified by truncating the coordinates to the hundred-thousandth space. In this example, the point located at (35.29843890°, 85.98073903° would be located in the square identified with the coordinates (35.29843°, 85.98073°). In other embodiments, each square may be associated with a different corner point, or even center point. In such embodiments, the square to which a given point is associated may be determined by rounding to a specified decimal point, rather than truncating. Combinations of truncation and rounding may also be used. Note that the term "square" used herein in not meant to be limiting; other notional grids may be formed of rectangles, triangles, hexagons, etc.

At block 210, once the notional grid is formed, the exemplary embodiment proceeds to count the number of points that lie within each square using a computer. The computer stores these tallies in a table. An exemplary such table that corresponds to the area depicted in FIG. 1 is presented below.

TABLE 1

| S | #S |
|---|---|
| A | 1 |
| B | 0 |
| C | 2 |
| D | 1 |
| E | 0 |
| F | 1 |
| G | 0 |
| H | 0 |
| I | 1 |
| J | 3 |
| K | 4 |

In Table 1, the first column, labeled "S" represents squares, and the second column, labeled "#S" represents a tally of points within the corresponding square. For purposes of illustration, each square is labeled using a letter (A-K). A table formed according to an embodiment of the invention may use a different identification system, such as identifying each square with one of its corner points as discussed above. As depicted in Table 1, and in reference to the geographic area of FIG. 1, square A includes one point, square B includes no points, square C includes two points, and so on, as illustrated graphically in FIG. 1.

At block 215, the exemplary embodiment computes a distance between each pair of squares in the geographic area of interest using a computer. In some embodiments, distances between squares are computed according to distances between their centers. In FIG. 1, the center of each square is depicted by an "x". In such embodiments, the distance between two squares may be calculated by determining the distance between the centers of such squares. Note that FIG. 1 includes concentric circles representing radii from the center of central square A to the centers of the other squares depicted in that figure. The computer also performs a join operation, to compare every square with every other square, producing and storing a table of distances and counts. A portion of an exemplary table corresponding to FIG. 1 appears below.

TABLE 2

| $S_1$ | $S_2$ | #$S_1$ | #$S_2$ | d |
|---|---|---|---|---|
| A | A | 1 | 1 | 0 |
| A | B | 1 | 0 | 1.4 |
| A | C | 1 | 2 | 1 |
| A | D | 1 | 1 | 1.4 |
| A | E | 1 | 0 | 1 |
| A | F | 1 | 1 | 1.4 |
| A | G | 1 | 0 | 1 |
| A | H | 1 | 0 | 1.4 |
| A | I | 1 | 1 | 1 |
| A | J | 1 | 3 | 2 |
| A | K | 1 | 4 | 2 |

In Table 2, the terms $S_1$ and $S_2$ each represent individual squares, #$S_1$ and #$S_2$ represent the number of points in the corresponding squares, and d represents a distance between the corresponding squares. It should be noted that #$S_1$ is provided in Table 2 for illustration purposes, but may not be necessary to complete the process. The distance d is computed as discussed above. For purposes of illustration, units of distance are simplified such that the distance between adjacent square is one (1). However, in an embodiment of the invention, actual distances may be recorded (e.g., in terms of meters). Note that the table produced at this step may contain $N^2$ rows, where N is the total number of squares in the area of interest. Note further that Table 2 represents only a portion of the full table that would be produced according to the information appearing in FIG. 1

A computer then sorts the previously produced table, for each square, according to distance. Further, a tally of points that have occurred within each specified distance is appended to the table, where, for purposes of such tally, the points are considered to be located at the center of the squares in which they appear. An exemplary table corresponding to Table 2 appears below.

TABLE 3

| $S_1$ | $S_2$ | #$S_2$ | d | $c_{S1, d}$ |
|---|---|---|---|---|
| A | A | 1 | 0 | 1 |
| A | C | 2 | 1 | 3 |
| A | E | 0 | 1 | 3 |
| A | G | 0 | 1 | 3 |
| A | I | 1 | 1 | 4 |
| A | B | 0 | 1.4 | 4 |
| A | D | 1 | 1.4 | 5 |
| A | F | 1 | 1.4 | 6 |

TABLE 3-continued

| $S_1$ | $S_2$ | #$S_2$ | d | $c_{S1, d}$ |
|---|---|---|---|---|
| A | H | 0 | 1.4 | 6 |
| A | J | 3 | 2 | 9 |
| A | K | 4 | 2 | 13 |

In Table 3, the terms $S_1$, $S_2$, #$S_2$ and d are as discussed above in relation to Table 2. The term $C_{S1, d}$ represents the tally of points that appear in any square that at least a portion of which is within a distance d of point $S_1$. That is, the term $C_{S1, d}$ represents a count of points within distance d of $S_1$, where each point is considered to be at the center of the square in which it is located. Table 3 represents a portion of Table 2 that has been sorted according to squares in the first column, and then according to distance. Thus, for example, Table 3 depicts that there are six (6) points within 1.4 distance from square A, as measured from the center of square A, and with the understanding that for the purposes of the tally, each point lies at the center of the square in which it appears. In other words, there are six (6) points within squares that intersect the middle concentric circle appearing in FIG. 1. In another example, Table 3 shows that there are thirteen (13) points in squares that intersect the outermost concentric circle, of radius two, in FIG. 1.

To simplify, the rows associated with squares that have a tally of points within the corresponding square of zero (0) may be deleted. An exemplary table illustration this simplification appears below.

TABLE 4

| $S_1$ | $S_2$ | #$S_2$ | d | $c_{S1, d}$ |
|---|---|---|---|---|
| A | A | 1 | 0 | 1 |
| A | C | 2 | 1 | 3 |
| A | I | 1 | 1 | 4 |
| A | D | 1 | 1.4 | 5 |
| A | F | 1 | 1.4 | 6 |
| A | J | 3 | 2 | 9 |
| A | K | 4 | 2 | 13 |

Note that the tally function reflected in the last column of Table 3 and Table 4 is symmetric and reflexive. Accordingly, the techniques of U.S. patent application Ser. No. 12/429,394 entitled "Statistical record linkage calibration for reflexive and symmetric distance measures at the field and field value levels without the need for human interaction" to Bayliss (hereinafter, the "Reflexive Symmetric Application") may be employed.

Accordingly, at block 220, the exemplary embodiment calculates match probabilities as discussed in detail in the Reflexive Symmetric Application using a computer. In general, a match probability associated with a given point and radius here represents the likelihood that a point picked at random from the entire area of interest lies within the given radius of the square within which the given point lies. Here, as elsewhere, distances are measured from square centers. By way of non-limiting example, Equation 1 may be used to calculate such match probabilities.

$$p_{S,d} = \frac{c_{S,d}}{c} \qquad \text{Equation 1}$$

In Equation 1, $p_{S,d}$ represents a match probability for given point that lies within square S and radius d. The term $c_{L,d}$ represents a count of points that lie within radius d of square S, and c represents a total number of points in the area of interest. Thus, c represents a total number of distinct entity representations and unlinked records that that include absolute geographic location information, as stored in a database.

Applying Equation 1 to the data of Table 4 yields the following. For purposes of illustration rather than limitation, assume that the geographic area of interest, which is partially illustrated in FIG. 1, contains a total of 100 points. That is, assume that there are 100 records in the associated database that contain absolute geographic location information as discussed above. Each match probability calculation provided below is performed relative to any point in square A. For those points that are a distance of one (1) from A, the associated tally of points is four (4). Therefore, the match probability for points within square A and a distance of one (1) may be computed as $p_{A,1}$=4/100=0.04. Likewise, the match probability for points in A and a distance of 1.4 may be computed as $p_{A,1,4}$=6/100=0.06. Lastly, the match probability for points in A and a distance of two (2) may be computed as $p_{A,2}$=13/100=0.13. Note that match probabilities may be the same for any points that lie within the same square.

At block 225, the exemplary embodiment calculates match weights. Such match probabilities may be converted to match weights and used to make linking decisions as discussed in Section I of the Second Generation Patents and Applications. That is, such match weights may be used in conjunction with other weights in linking matching decisions, e.g., based on Equations 3-6 from Section I of the Second Generation Patents and Applications. An exemplary formula for producing such match weights appears below.

$$w_{S,d} = -\log p_{S,d} \quad \text{Equation 2}$$

In Equation 2, $W_{S,d}$ represents a match weight for any point within a given square S and radius d. The term $p_{L,d}$ represents a match probability as calculated using, e.g., Equation 1. In Equation 2, and throughout this disclosure, log represents logarithm base two (2), by way of non-limiting example. Logarithms of different bases may be used instead.

Applying Equation 2 to Table 4, and using the results produced according to Equation 1, yields the following computations of match weights. As discussed above, we have the following match probabilities: $p_{A,1}$=0.04, $p_{A,1.4}$=0.06, and $p_{A,2}$=0.13. Applying Equation 2 yields:

$w_{A,1} = -\log(p_{A,1}) = -\log(0.04) = 4.64$ $w_{A,1.4} = -\log(p_{A,1.4}) = -\log(0.06) = 4.06$, and $w_{A,2} = -\log(p_{A,2}) = -\log(0.13) = 2.94$.

Note that in some embodiments, each match weight is converted into an integer before use. In such embodiments, match weights may be rounded or truncated before use. Thus, weights may be calculated according to $w_{S,d}$=round(-log $p_{S,d}$) or $w_{S,d}$=trunc(-log $p_{S,d}$), where round means round to the nearest integer, and trunc means truncate by dropping the decimal portion. For example, applying the round operator to the match weights computed above yields:

$w_{A,1}$=round(-log($p_{A,1}$))=round(4.64)=5

$w_{A,1.4}$=round(-log($p_{A,1.4}$))=round(4.06)=4, and $w_{A,2}$=round(-log($p_{A,2}$))=round(2.94)=3.

Next, a computer associates a table of match weights and distances with each point. Such a table may be produced as described presently. First, the computer prepares a table of match weights and associated distances for each square. An exemplary such table for square A of FIG. 1 appears below.

TABLE 5

| d | w |
|---|---|
| 1 | 5 |
| 1.4 | 4 |
| 2 | 3 |

Note that Table 5 is specific to square A. Embodiments of the present invention may produce and store such tables for each point, or for each square. The computer may further refine this table by keeping only the largest distance for each match weight. In table 5, each distance is associated with a different match weight. Therefore, the largest distance for each match weight is already provided in Table 5.

Table 5 may be appended to each point that appears in square A. Recall that each point is identified with a corresponding record or entity representation that includes the specified absolute geographic coordinates. Thus, Table 5 may be appended (or otherwise attached) to such records or entity representations that are identified with each point in square A.

In general, the entire process described above in relation to FIG. 1 may be performed for each point in the area of interest. The end result of such an process is that a table of distances and match weights, such as exemplary Table 5, is added to each record or entity representation in the database that corresponds to a point.

In general, the smaller the distance between two points, the greater the probability that the two points are associated with the same individual, record, or entity representation. Conversely, the greater the distance between two points, the smaller the probability that the two points are associated with the same individual, record, or entity representation. In areas of interest that are more densely populated, however, the distance between two points alone may not be as significant in determining the probability that two points are associated with the same individual, record, or entity representation. Accordingly, match weights that consider the density of a population surrounding a particular point of interest or square of interest may more accurately influence the link determination.

In the present invention, the density of a population surrounding a given point of interest or a given square of interest may be considered by tallying the amount of points within a given radius from the center of the square. As a result, a match weight associated with a given radius from a point of interest or a square of interest that lies within a sparsely populated area may be greater than a match weight associated with the given distance from a point of interest or a square of interest that lies within a densely populated area.

At block 230, the exemplary embodiment links records. The match weights may be used as part of a linking operation, such as that described in Section I of the Second Generation Patents and Applications. That is, once the database is processed as discussed above to provide match weights to each record or entity representation that includes absolute geographic coordinates, the database may be processed to decide whether any records should be linked because they correspond to the same entity.

Any match formula from Section I of the Second Generation Patents and Applications may be used. For concreteness, consider Equation 5 from that section, relabeled as Equation 3 for the present disclosure.

$$S(r_1, r_2) = \sum_{i=1}^{I} p_i w_i \qquad \text{Equation 3}$$

In Equation 3 above, the index i may range over each field common to records $r_1$ and $r_2$ under comparison, from one (1) to I. That is, to decide whether to link records $r_1$ and $r_2$, Equation 3 may be calculated according to common fields of such records to derive a score, and that score may determine whether to link records as discussed in detail in Section I of the Second Generation Patents and Applications. A detailed discussion of handling non-geographic-coordinate fields appears in the Second Generation Patents and Applications.

A discussion of how to handle absolute geographic coordinates appears presently. Given two sets of absolute geographic coordinates $v_1$, $v_2$ in records $r_1$, $r_2$ respectively, the corresponding term $p_i w_i$ in Equation 3 above (Equation 5 from the Second Generation Patents and Applications) may be calculated by setting the associated $p_i$ equal to one (1). A discussion of computing $w_i$ follows.

Given the two sets of coordinates $v_1$, $v_2$ in records $r_1$, $r_2$, note that each record has a table of distances and weights attached (e.g., a table computed as described above in relation to Table 5). The computer proceeds to compute the squares, denoted here by $S_1$ and $S_2$, in which coordinates $v_1$, $v_2$ appear, using the truncation technique described above regarding the notional grid. Once the squares are determined, the computer looks up the distance between them (e.g., using a table computed as discussed above in relation to Table 2). Alternately, the computer may compute the distance between the squares anew. Still alternately, the computer may compute the exact distance between coordinates $v_1$, $v_2$. Once the distance is determined according to any of the aforementioned techniques, the computer retrieves the weights corresponding to that distance from the tables attached to each record $r_1$, $r_3$ (that is, the tables computed as discussed above in relation to Table 5). More particularly, for each record, the weight that corresponds to the distance between coordinates $v_1$, $v_2$ is retrieved from the respective table. Thus, given the distance between points $v_1$, $v_2$, the weight corresponding to the next greatest distance appearing in the respective table is selected. At this point, given records $r_1$, $r_2$, the computer has selected associated weights, denoted here for purposes of discussion as $w_1$, $w_2$.

The associated weight for use in Equation 3 above, $w_i$, may be determined as a function of the geographic coordinate match weights $w_1$, $w_2$ calculated for the points $v_1$, $v_2$ in records $r_1$, $r_2$ respectively. Various techniques for determining such weights may be employed. In some embodiments, either of $v_1$, $v_2$ may be used for $w_i$. In other embodiments, an arithmetic mean may be used. In this instance, the arithmetic mean may be computed as: $w_i = (w_1 + w_2)/2$. In yet other embodiments, a geometric mean may be used. For this example, the geometric mean may be computed as: $w_i = \sqrt{w_1 w_2}$. In yet other embodiments, the blended weight may be computed according to the following formula.

$$w_i = \log \frac{2^{w_1} + 2^{w_2}}{2} \qquad \text{Equation 4}$$

Once the weight for geographic coordinate field values $v_1$, $v_2$ is determined, it is substituted in the matching formula for the term $p_i w_i$ that corresponds to the geographic coordinate field in records $r_1$, $r_2$. The computer applies the matching formula as discussed in the Second Generation Patents and Applications, and makes a decision as to whether to link records $r_1$, $r_2$. The computer proceeds to link the records or not link the records, as appropriate. This linking operation may be performed for all records and entity representation in the database.

A summary of the process up to this point follows. Given a database containing records, entity representations, or a combination thereof, a computer operates on the database to associate geographic coordinate match weight tables to every record that includes geographic coordinates. Once these match weight tables are added to the records, the computer may proceed to perform a linking operation, using the geographic coordinate match weights in addition to the other types of match weights discussed in great detail in the Second Generation Patents and Applications. This typically results in the linking of a number of records or entity representations, such that the total number of records or entity representations may be reduced. Note that the geographic coordinates remain associated with each record after the linking process.

Just as described in the Second Generation Patents and Applications (e.g., in the Reflexive Symmetric Application), this entire process may be iterated. Thus, between the first iteration and the second iteration, the database may undergo a preliminary linking operation, which may be based on the match weights generated by the first iteration as discussed above. The result of the preliminary linking operation may be that, if the database initially contained only unlinked records, after the first iteration, the database contains entity representations, that is, multiple sets of linked records, where each such linked set is meant to contain records that correspond to the same individual.

Between linking operations, several other operations may be performed, as discussed in detail in the Second Generation Patents and Applications. That is, intermediate operations may be performed. Exemplary such operations include transitional linking, propagation and delinking. Each is discussed in detail in the Second Generation Patents and Applications, incorporated herein by reference.

Note that each subsequent iteration produces match probabilities and match weights. However, the match probabilities and match weights produced by the second iteration may generally be more accurate than those produced by the first iteration. After the first iteration, the database contains sets of linked records in the form of entity representations. These iterations may be performed a number of times as disclosed in detail in the Second Generation Patents and Applications in order to achieve a thoroughly linked database.

Note that certain advantageous features of the above technique are not limited to handling geographic coordinates. More particularly, certain techniques may be used for any matching technique that utilizes any symmetric, reflexive function as discussed in the Symmetric Reflexive Application. In such embodiments, the techniques described above may be used to calculate match probabilities and match weights for any type of field value (e.g., character strings).

These embodiments provide match probabilities and match weights associated with near matches. For a record that contains a particular field value in a particular field, certain embodiments provide a probability that a record or entity representation chosen at random contains a field value in the particular field that lies within a specified distance of the particular field value. In such embodiments, a separate probability may be associated with one or more distances and each field value. Such field value probabilities may be converted to field value weights and used to make linking decisions as discussed in the Second Generation Patents and Applications.

Figure 3:
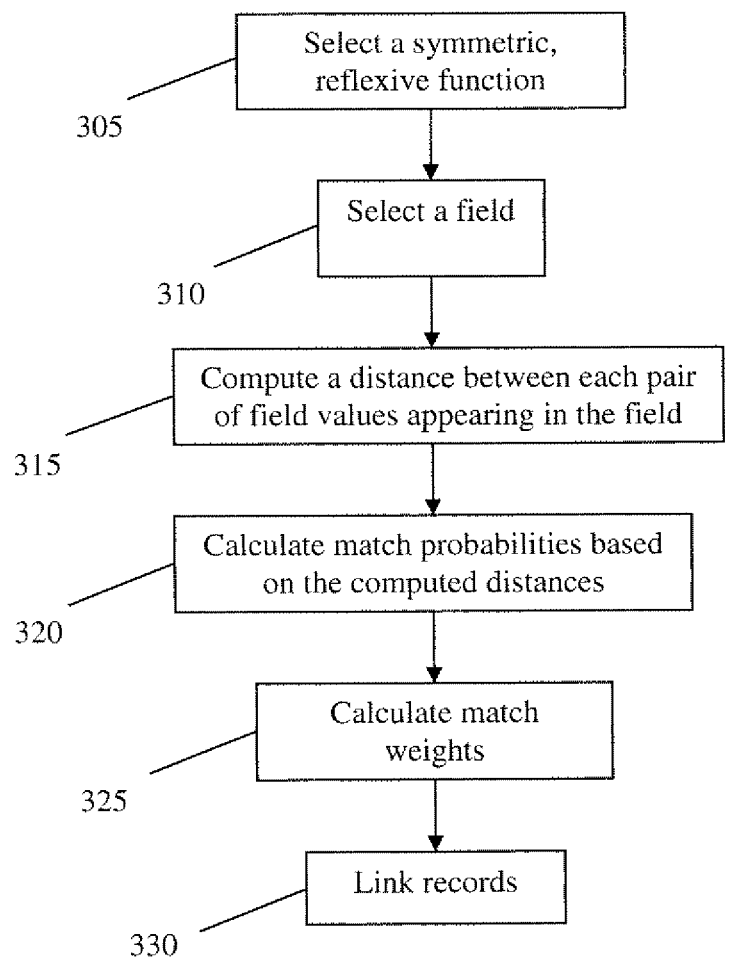
FIG. 3 depicts a flowchart depicting an exemplary embodiment according to one or more embodiments shown and described herein.

A technique for matching records using any symmetric, reflexive function is discussed presently with reference to FIG. 3. FIG. 3 is a flowchart depicting an exemplary embodiment of the present invention. At block 305, the exemplary embodiment selects a symmetric, reflexive function. By way of non-limiting example, an edit distance function may be used. Such functions measure how many discrete edits would be required to change one field value into another field value. There are several types of edit distance metrics, including, by way of non-limiting example, Hamming distance, Levenshtein distance, Damerau-Levenshtein distance, Jaro-Winkler distance, Wagner-Fischer distance, Ukkonen distance and Hirshberg distance. By way of illustration, the Hamming distance between field values "disk" and "disc" is one (1), as one substitution would be required to transform one field value to the other. Importantly, the present invention is not limited to edit distance functions. Indeed, any function that is symmetric and reflexive may suffice.

At block 310, the exemplary embodiment selects at least one field. At block 315, the exemplary embodiment computes a distance $D(v_1, v_2)$ between each pair of field values appearing in the field in any record in the database, where $v_1$ represents a first field value in the pair of field values and $v_2$ represents a second field value in the pair of field values using a computer.

The computer also performs a join operation, to compare every field value with every other field value, producing and storing a table of field values and distances. A portion of an exemplary table specific to a field value A appears below.

TABLE 6

| $v_1$ | $v_2$ | d |
|---|---|---|
| A | A | 0 |
| A | B | 1.5 |
| A | C | 3 |
| A | D | 1 |
| A | E | 2 |
| A | F | 1.25 |

In Table 6, the terms $v_1$ and $v_2$ each represent individual field values and d represents a distance between the corresponding field values as determined by the selected symmetric reflexive function. In the above, A-F represent arbitrary field values, not limited to geographic coordinates. Note that the table produced at this step may contain $N^2$ rows, where N is the total number of records or entity representation in the database. Note further that Table 6 represents only a portion of the full table that would be produced according to the technique described above.

A computer then sorts the previously produced table, for each field value, according to distance. Further, a tally of field values that have occurred within each specified distance is appended to the table. An exemplary table corresponding to Table 6 appears below.

TABLE 7

| $v_1$ | $v_2$ | d | $c_{v1,d}$ |
|---|---|---|---|
| A | A | 0 | 1 |
| A | D | 1 | 2 |
| A | F | 1.25 | 3 |
| A | B | 1.5 | 4 |
| A | E | 2 | 5 |
| A | C | 3 | 6 |

In Table 7, the terms $v_1$, $v_2$, and d are as discussed above in relation to Table 6. The term $C_{v1,d}$ represents the tally of field values that at least a portion of which is within a distance d of point $v_1$. That is, the term $C_{v1,d}$ represents a count of field values within distance d of $v_1$. Table 7 represents a portion of Table 6 that has been sorted according to field values in the first column, and then according to distance. Thus, for example, Table 7 depicts that there is one (1) field value within 0.00 distance from field value A. Table 7 also depicts that there are two (2) field values within 1.00 distance from field value A. Likewise, Table 7 shows that there are three (3) field values within 1.25 distance from field value A and so on.

At block 320, the exemplary embodiment calculates match probabilities based on the tallies using a computer. In general, a match probability associated with a given field value here represents the likelihood that a record or entity representation chosen at random contains a field value in the selected field that lies within a specified distance of the given field value. By way of non-limiting example, Equation 5 (which is analogous to Equation 1) may be used to calculate such match probabilities.

$$p_{V,d} = \frac{c_{V,d}}{c} \qquad \text{Equation 5}$$

In Equation 5, $p_{V,d}$ represents a match probability for a given field value that lies within distance d. The term $c_{V,d}$ represents a count of field values that lie within distance d of field value V, and c represents a total number of records or entity representations. Thus, c represents a total number of distinct entity representations and unlinked records that include a non-null field value in the selected field, as stored in a database.

Applying Equation 5 to the data of Table 7 yields the following. For purposes of illustration rather than limitation, assume there are a total of 25 records or entity representations in the database. Each match probability calculation provided below is performed relative to field value A. For those field values that are a distance of one (1) from field value A, the associated tally of field values is two (2). Therefore, the match probability for field values a distance of one (1) from field value A may be computed as $p_{A,1}=2/25=0.08$. Likewise, the match probability for field values within a distance of 1.25 from field value A may be computed as $p_{A,1.25}=3/25=0.12$. The match probability for field values within a distance of 1.5 from field value A may be computed as $p_{A,1.5}=4/25=0.16$. The match probability for field values within a distance of two (2) from field value A may be computed as $p_{A,2}=5/25=0.20$. Lastly, the match probability for field values within a distance of three (3) from field value A may be computed as $p_{A,3}=6/25=0.24$. Note that match probabilities may be the same for any field values that lie within the same distance.

At block 325, the exemplary embodiment calculates match weights. Such match probabilities may be converted to match weights and used to make linking decisions as discussed in Section I of the Second Generation Patents and Applications. That is, such match weights may be used in conjunction with other weights in linking matching decisions, e.g., based on Equations 3-6 from Section I of the Second Generation Patents and Applications. An exemplary formula for producing such match weights appears below.

$$w_{V,d} = -\log p_{V,d} \qquad \text{Equation 6}$$

In Equation 2, $w_{V,d}$ represents a match weight for any field value within a given distance d of V. The term $p_{V,d}$ represents a match probability as calculated using, e.g., Equation 5.

Applying Equation 6 to Table 7, and using the results produced according to Equation 5, yields the following computations of match weights. As discussed above, we have the following match probabilities: $p_{A,1}$=0.08, $p_{A,1.25}$=0.12, $p_{A,1.5}$=0.16, $p_{A,2}$=0.20, and $p_{A,3}$=0.24. Applying Equation 6 yields:

$$w_{A,1}=-\log(p_{A,1})=-\log(0.08)=3.6$$

$$w_{A,1.25}=-\log(p_{A,1.25})=-\log(0.12)=3.0$$

$$w_{A,1.5}=-\log(p_{A,1.5})=-\log(0.16)=2.6$$

$$w_{A,2}=-\log(p_{A,2})=-\log(0.20)=2.3,$$

$$w_{A,3}=-\log(p_{A,3})=-\log(0.24)=2.1.$$

In some embodiments, each match weight is converted into an integer before use. Thus, weights may be calculated according to $w_{V,d}$=round($-\log p_{V,d}$) or $w_{V,d}$=trunc($-\log p_{V,d}$), where round and trunc are as discussed above. For example, applying the round operator to the match weights computed above yields:

$$w_{A,1}=\text{round}(-\log(p_{A,1}))=\text{round}(3.6)=4$$

$$w_{A,1.25}=\text{round}(-\log(p_{A,1.25}))=\text{round}(3.0)=3$$

$$w_{A,1.5}=\text{round}(-\log(p_{A,1.5}))=\text{round}(2.6)=3$$

$$w_{A,2}=\text{round}(-\log(p_{A,2}))=\text{round}(2.3)=2, \text{ and}$$

$$w_{A,3}=\text{round}(-\log(p_{A,3}))=\text{round}(2.1)=2.$$

Next, a computer associates a table of match weights and distances with each field value. Such a table may be produced as described presently. First, the computer prepares a table of match weights and associated distances for each field value. An exemplary such table for field value A appears below.

TABLE 8

| d | w |
|---|---|
| 1 | 4 |
| 1.25 | 3 |
| 1.5 | 3 |
| 2 | 2 |
| 3 | 2 |

Note that Table 8 is specific to field value A. Embodiments of the present invention may produce and store such tables for each field value. The computer may further refine this table by keeping only the largest distance for each match weight. In table 8, both distances of 1.25 and 1.5 are associated with match weight three (3). Likewise, both distances two (2) and three (3) are associated with match weight two (2). Accordingly, Table 8 processed to remove all but the greatest distances for each match weight may appear as follows.

TABLE 9

| d | w |
|---|---|
| 1 | 4 |
| 1.5 | 3 |
| 3 | 2 |

Table 9 may be appended to each field value A. Since each field value is identified with a corresponding record or entity representation that includes the specified field value, Table 9 may be appended to such records or entity representations that contain field value A in the selected field.

In general, the entire process described above may be performed for each field value in the selected field. The end result of such an process is that a table of distances and match weights, such as exemplary Table 9, is added to each record or entity representation in the database that corresponds to a field value in a selected field.

At block 330, the exemplary embodiment links records. The match weights may be used as part of a linking operation, such as that described in Section I of the Second Generation Patents and Applications. That is, once the database is processed as discussed above to provide match weights to each record or entity representation that includes the field values in the selected fields, the database may be processed to decide whether any records should be linked because they correspond to the same entity. Finally, this process may be iterated as discussed above in relation to FIG. 1.

Any of the techniques disclosed herein may be applied to a portion of a database as opposed to the entirety of a database.

The techniques discussed herein may be combined with any of the techniques disclosed in the First Generation Patents And Applications and the Second Generation Patents And Applications. The inventors explicitly consider such combinations at the time of filing the present disclosure.

The equations, formulas and relations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

Certain embodiments of the inventions disclosed herein may output a more thoroughly linked database. Certain embodiments of the inventions disclosed herein may output any information contained in any record in a database.

Embodiments, or portions of embodiments, disclosed herein may be in the form of "processing machines," such as general purpose computers or the computers disclosed in the First Generation Patents and Applications, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. In particular, the hardware described in the First Generation Patents And Applications may be used for any embodiment disclosed herein. A cluster of personal computers or blades connected via a backplane (network switch) may be used to implement some embodiments.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated, for example, that the processor may be two ore more pieces of equipment in two different physical locations. The two ore more distinct pieces of equipment may be connected in any suitable manner. Additionally, the memory may include two or more portions of memory in two or more physical locations.

To explain further, processing as described above is performed by various components and various memories. However, it is appreciated that the processing performed by two or more distinct components as described above may, in accordance with a further embodiment of the invention, be performed by a single component. Further, the processing performed by one distinct component as described above may be performed by two or more distinct components. In a similar manner, the memory storage performed by two or more distinct memory portions as described above may, in accordance with a further embodiment of the invention, be performed by a single memory portion. Further, the memory storage performed by one distinct memory portion as described above may be performed by two or more memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include Enterprise Control Language ("ECL," available from LexisNexis), assembly language, Ada, APL, C, C++, dBase, Fortran, Java, Modula-2, Pascal, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements an embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In some embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    generating entity representations in a computer implemented database using a record matching formula, the database comprising a plurality of records, each record comprising a plurality of fields, each field capable of containing a field value;
    generating parameters for the record matching formula wherein at least a portion of parameters for the record matching formula are generated using a symmetric and reflexive function and configured for a particular field value appearing in a selected field of at least one record and wherein the record matching formula comprises a weighted sum of probabilities that two records match;
    forming a notional grid over a geographic area of interest that contains a plurality of points, wherein the geographic area of interest comprises a plurality of squares and wherein each of the plurality of points is associated with one of the plurality of records in the database that contains absolute geographic location information;
    calculating a plurality of match probabilities, wherein each match probability reflects a likelihood that a first point in the geographic area of interest lies within a predetermined distance of a predetermined square within which a second point lies as determined by the symmetric and reflexive function, wherein the symmetric and reflexive function has the property that its output is unchanged if the order of its inputs is changed and the property that it outputs zero if its inputs are equal to each other;
    calculating a plurality of match weights based on the plurality of match probabilities;
    linking records or entity representations with non-identical field values, wherein linking comprises linking at least two entity representations in the database based on one or more of the plurality of match weights using the record matching formula; and
    retrieving information from at least one record in the database.

2. The method of claim 1, wherein the absolute geographic location information comprises at least one of latitude coordinate data and longitude coordinate data.

3. The method of claim 1, wherein the geographic area of interest comprises at least one of a portion of a city a portion of a county, a portion of a state, a portion of a country, a portion of a continent, and a portion of the world.

4. The method of claim 1, wherein each of the plurality of points represents a location represented by the absolute geographic location information contained in a corresponding record.

5. The method of claim 1, further comprising generating, for each of the plurality of squares, a point tally that indicates an amount of the plurality of points that lie within a corresponding square.

6. The method of claim 1, further comprising calculating a distance between each pair of squares of the plurality of squares.

7. The method of claim 6, wherein the distance between a pair of squares is calculated as the distance between centers of the pair of squares.

8. The method of claim 1, wherein the distance comprises a radius.

9. A system comprising:
    a processor programmed to generate entity representations in a computer implemented database using a record matching formula, the database comprising a plurality of records, each record comprising a plurality of fields, each field capable of containing a field value;

a processor programmed to generate parameters for the record matching formula wherein at least a portion of parameters for the record matching formula are generated using a symmetric and reflexive function and configured for a particular field value appearing in a selected field of at least one record and wherein the record matching formula comprises a weighted sum of probabilities that two records match;

a processor programmed to form a notional grid over a geographic area of interest that contains a plurality of points, wherein the geographic area of interest comprises a plurality of squares and wherein each of the plurality of points is associated with one of the plurality of records in the database that contains absolute geographic location information;

a processor programmed to calculate a plurality of match probabilities, wherein each match probability reflects a likelihood that a first point in the geographic area of interest lies within a predetermined distance of a predetermined square within which a second point lies as determined by the symmetric and reflexive function, wherein the symmetric and reflexive function has the property that its output is unchanged if the order of its inputs is changed and the property that it outputs zero if its inputs are equal to each other;

a processor programmed to calculate a plurality of match weights based on the plurality of match probabilities;

a processor programmed to link at least two entity representations in the database based on one or more of the plurality of match weights using the record matching formula; and a processor programmed to retrieve information from at least one record in the database.

10. The system of claim 9, wherein the absolute geographic location information comprises at least one of latitude coordinate data and longitude coordinate data.

11. The system of claim 9, wherein the geographic area of interest comprises at least one of a portion of a city a portion of a county, a portion of a state, a portion of a country, a portion of a continent, and a portion of the world.

12. The system of claim 9, wherein each of the plurality of points represents a location represented by the absolute geographic location information contained in a corresponding record.

13. The system of claim 9, further comprising a processor programmed to generate, for each of the plurality of squares, a point tally that indicates an amount of the plurality of points that lie within a corresponding square.

14. The system of claim 9, further comprising a processor programmed to calculate a distance between each pair of squares of the plurality of squares.

15. The system of claim 14, wherein the distance between a pair of squares is calculated as the distance between centers of the pair of squares.

16. The system of claim 9, wherein the distance comprises a radius.

* * * * *